(12) United States Patent
Johnston et al.

(10) Patent No.: US 7,509,625 B2
(45) Date of Patent: Mar. 24, 2009

(54) SYSTEM AND METHOD FOR COMPREHENSIVE CODE GENERATION FOR SYSTEM MANAGEMENT

(75) Inventors: Keith Johnston, Austin, TX (US); Mario Garcia, Austin, TX (US)

(73) Assignee: Eric White, Austin, TX (US)

( * ) Notice: Subject to any disclaimer, the term of this patent is extended or adjusted under 35 U.S.C. 154(b) by 528 days.

(21) Appl. No.: 11/078,223

(22) Filed: Mar. 10, 2005

(65) Prior Publication Data

US 2005/0204031 A1 Sep. 15, 2005

Related U.S. Application Data

(60) Provisional application No. 60/551,754, filed on Mar. 10, 2004.

(51) Int. Cl.
*G06F 9/44* (2006.01)
(52) U.S. Cl. ..................... 717/100; 717/106
(58) Field of Classification Search .......... 717/100, 717/106
See application file for complete search history.

(56) References Cited

U.S. PATENT DOCUMENTS

| | | | |
|---|---|---|---|
| 5,673,393 A | 9/1997 | Marshall et al. |
| 5,706,427 A | 1/1998 | Tabuki |
| 5,748,901 A | 5/1998 | Afek et al. |
| 5,878,231 A | 3/1999 | Baehr et al. |
| 5,896,499 A | 4/1999 | McKelvey |
| 5,901,148 A | 5/1999 | Bowen et al. |
| 5,936,542 A | 8/1999 | Kleinrock et al. |
| 5,953,506 A | 9/1999 | Kalra et al. |
| 5,987,134 A | 11/1999 | Shin et al. |
| 5,996,013 A | 11/1999 | Delp et al. |
| 6,085,241 A | 7/2000 | Otis |
| 6,088,451 A | 7/2000 | He et al. |
| 6,092,200 A | 7/2000 | Muniyappa et al. |
| 6,108,782 A | 8/2000 | Fletcher et al. |
| 6,130,892 A | 10/2000 | Short et al. |

(Continued)

FOREIGN PATENT DOCUMENTS

EP   0587522 B1   1/2000

(Continued)

OTHER PUBLICATIONS

U.S. Patent Office Official Action issued Jul. 13, 2007 in U.S. Appl. No. 10/922,041, Eric White.

(Continued)

*Primary Examiner*—Wei Y. Zhen
*Assistant Examiner*—Philip R. Wang
(74) *Attorney, Agent, or Firm*—Sprinkle IP Law Group (57) ABSTRACT

A system and method for generating configuration code using an SNMP MIB, comprising generating a first configuration layer based on an XML MIB derived from the SNMP MIB. The first configuration layer is configured to provide an SNMP Agent with access to a second configuration layer. A second configuration layer is generated for a configuration table based on the XML MIB and comprises methods for managing the configuration table. The second configuration layer is configured to receive a configuration request containing configuration information representing a change to the configuration table from the SNMP Agent, call a first configuration listener method from a configuration listener layer, and receive a first status code from the configuration listener layer.

15 Claims, 6 Drawing Sheets

U.S. PATENT DOCUMENTS

| | | | |
|---|---|---|---|
| 6,131,116 | A | 10/2000 | Riggins et al. |
| 6,157,953 | A | 12/2000 | Chang et al. |
| 6,173,331 | B1 | 1/2001 | Shimonishi |
| 6,176,883 | B1 | 1/2001 | Holloway et al. |
| 6,185,567 | B1 | 2/2001 | Ratnaraj et al. |
| 6,194,992 | B1 | 2/2001 | Short et al. |
| 6,205,552 | B1 | 3/2001 | Fudge |
| 6,212,558 | B1 | 4/2001 | Antur et al. |
| 6,233,607 | B1 | 5/2001 | Taylor et al. |
| 6,243,815 | B1 | 6/2001 | Antur et al. |
| 6,275,693 | B1 | 8/2001 | Lin et al. |
| 6,295,294 | B1 | 9/2001 | Odlyzko |
| 6,321,339 | B1 | 11/2001 | French et al. |
| 6,324,648 | B1 | 11/2001 | Grantges, Jr. |
| 6,336,133 | B1 | 1/2002 | Morris et al. |
| 6,404,743 | B1 | 6/2002 | Meandzija |
| 6,421,319 | B1 | 7/2002 | Iwasaki |
| 6,463,474 | B1 | 10/2002 | Fuh et al. |
| 6,473,793 | B1 | 10/2002 | Dillon et al. |
| 6,473,801 | B1 | 10/2002 | Basel |
| 6,477,143 | B1 | 11/2002 | Ginossar |
| 6,502,131 | B1 | 12/2002 | Vaid et al. |
| 6,516,417 | B1 | 2/2003 | Pegrum et al. |
| 6,535,879 | B1 | 3/2003 | Behera |
| 6,539,431 | B1 | 3/2003 | Sitaraman et al. |
| 6,636,894 | B1 | 10/2003 | Short et al. |
| 6,678,733 | B1 | 1/2004 | Brown et al. |
| 6,708,212 | B2 | 3/2004 | Porras et al. |
| 6,732,179 | B1 | 5/2004 | Brown et al. |
| 6,735,691 | B1 | 5/2004 | Capps et al. |
| 6,757,740 | B1 | 6/2004 | Parekh et al. |
| 6,785,252 | B1 | 8/2004 | Zimmerman et al. |
| 6,789,110 | B1 | 9/2004 | Short et al. |
| 6,804,783 | B1 | 10/2004 | Wesinger et al. |
| 6,823,385 | B2 | 11/2004 | McKinnon et al. |
| 6,917,622 | B2 | 7/2005 | McKinnon et al. |
| 7,013,331 | B2 | 3/2006 | Das |
| 7,120,934 | B2 | 10/2006 | Ishikawa |
| 7,143,283 | B1 | 11/2006 | Chen et al. |
| 7,146,639 | B2 | 12/2006 | Bartal et al. |
| 7,181,017 | B1 | 2/2007 | Nagel et al. |
| 7,185,368 | B2 | 2/2007 | Copeland, III |
| 7,266,754 | B2 | 9/2007 | Shah et al. |
| 7,272,646 | B2 | 9/2007 | Cooper et al. |
| 7,324,947 | B2 | 1/2008 | Jordan et al. |
| 7,325,042 | B1 | 1/2008 | Soscia et al. |
| 7,406,530 | B2 | 7/2008 | Brown et al. |
| 7,420,956 | B2 | 9/2008 | Karaoguz et al. |
| 2001/0038639 | A1 | 11/2001 | McKinnon et al. |
| 2001/0038640 | A1 | 11/2001 | McKinnon et al. |
| 2001/0038645 | A1 | 11/2001 | McKinnon et al. |
| 2001/0039576 | A1 | 11/2001 | Kanada |
| 2001/0039582 | A1 | 11/2001 | McKinnon et al. |
| 2002/0013844 | A1 | 1/2002 | Garrett et al. |
| 2002/0021665 | A1 | 2/2002 | Bhagavath et al. |
| 2002/0023160 | A1 | 2/2002 | Garrett et al. |
| 2002/0029260 | A1 | 3/2002 | Dobbins et al. |
| 2002/0035699 | A1 | 3/2002 | Crosbie |
| 2002/0042883 | A1 | 4/2002 | Roux et al. |
| 2002/0046264 | A1 | 4/2002 | Dillon et al. |
| 2002/0052950 | A1 | 5/2002 | Pillai et al. |
| 2002/0055968 | A1 | 5/2002 | Wishoff et al. |
| 2002/0059408 | A1 | 5/2002 | Pattabhiraman et al. |
| 2002/0075844 | A1 | 6/2002 | Hagen |
| 2002/0085719 | A1 | 7/2002 | Crosbie |
| 2002/0087713 | A1 | 7/2002 | Cunningham |
| 2002/0091944 | A1 | 7/2002 | Anderson et al. |
| 2002/0112183 | A1 | 8/2002 | Baird, III et al. |
| 2002/0112186 | A1 | 8/2002 | Ford et al. |
| 2002/0120741 | A1 | 8/2002 | Webb et al. |
| 2002/0123335 | A1 | 9/2002 | Luna et al. |
| 2002/0124078 | A1 | 9/2002 | Conrad |
| 2002/0124103 | A1 | 9/2002 | Maruyama et al. |
| 2002/0129143 | A1 | 9/2002 | McKinnon, III et al. |
| 2002/0131404 | A1 | 9/2002 | Mehta et al. |
| 2002/0133581 | A1 | 9/2002 | Schwartz et al. |
| 2002/0133589 | A1 | 9/2002 | Gubbi et al. |
| 2002/0136226 | A1 | 9/2002 | Christoffel et al. |
| 2002/0138762 | A1 | 9/2002 | Horne |
| 2002/0138763 | A1 | 9/2002 | Delany et al. |
| 2002/0143964 | A1 | 10/2002 | Guo et al. |
| 2002/0152284 | A1 | 10/2002 | Cambray et al. |
| 2002/0162030 | A1 | 10/2002 | Brezak et al. |
| 2002/0164952 | A1 | 11/2002 | Singhai et al. |
| 2002/0165990 | A1 | 11/2002 | Singhai et al. |
| 2002/0169867 | A1 | 11/2002 | Mann et al. |
| 2002/0174227 | A1 | 11/2002 | Hartsell et al. |
| 2002/0178282 | A1 | 11/2002 | Mysore et al. |
| 2002/0199007 | A1 | 12/2002 | Clayton et al. |
| 2003/0041104 | A1 | 2/2003 | Wingard et al. |
| 2003/0043846 | A1 | 3/2003 | Purpura et al. |
| 2003/0055994 | A1 | 3/2003 | Herrmann et al. |
| 2003/0061506 | A1 | 3/2003 | Cooper et al. |
| 2003/0069956 | A1* | 4/2003 | Gieseke et al. ............... 709/223 |
| 2003/0070170 | A1 | 4/2003 | Lennon |
| 2003/0078784 | A1 | 4/2003 | Jordan et al. |
| 2003/0087629 | A1 | 5/2003 | Juitt et al. |
| 2003/0126608 | A1 | 7/2003 | Safadi et al. |
| 2003/0135753 | A1 | 7/2003 | Batra et al. |
| 2003/0149751 | A1 | 8/2003 | Bellinger et al. |
| 2003/0154399 | A1 | 8/2003 | Zuk et al. |
| 2003/0159072 | A1 | 8/2003 | Bellinger et al. |
| 2003/0163603 | A1* | 8/2003 | Fry et al. .................... 709/328 |
| 2003/0177477 | A1* | 9/2003 | Fuchs ........................ 717/136 |
| 2003/0212800 | A1 | 11/2003 | Jones et al. |
| 2003/0217126 | A1 | 11/2003 | Polcha et al. |
| 2004/0015719 | A1 | 1/2004 | Lee et al. |
| 2004/0047356 | A1 | 3/2004 | Bauer |
| 2004/0049586 | A1 | 3/2004 | Ocepek et al. |
| 2004/0064836 | A1 | 4/2004 | Ludvig et al. |
| 2004/0073941 | A1 | 4/2004 | Ludvig et al. |
| 2004/0085906 | A1 | 5/2004 | Ohtani et al. |
| 2004/0093513 | A1 | 5/2004 | Cantrell et al. |
| 2004/0103426 | A1 | 5/2004 | Ludvig et al. |
| 2004/0122956 | A1 | 6/2004 | Myers et al. |
| 2004/0172557 | A1 | 9/2004 | Nakae et al. |
| 2004/0179822 | A1 | 9/2004 | Tsumagari et al. |
| 2004/0181816 | A1 | 9/2004 | Kim et al. |
| 2004/0199635 | A1 | 10/2004 | Ta et al. |
| 2004/0210633 | A1 | 10/2004 | Brown et al. |
| 2004/0268234 | A1* | 12/2004 | Sampathkumar et al. .... 715/513 |
| 2005/0044422 | A1 | 2/2005 | Cantrell et al. |
| 2005/0091303 | A1 | 4/2005 | Suzuki |
| 2005/0149721 | A1 | 7/2005 | Lu et al. |
| 2005/0193103 | A1 | 9/2005 | Drabik |
| 2005/0195854 | A1 | 9/2005 | Agmon et al. |
| 2005/0204168 | A1 | 9/2005 | Johnston et al. |
| 2006/0168229 | A1 | 7/2006 | Shim et al. |
| 2006/0173992 | A1 | 8/2006 | Weber et al. |
| 2006/0184618 | A1 | 8/2006 | Kurup et al. |
| 2007/0073718 | A1 | 3/2007 | Ramer et al. |
| 2007/0186113 | A1 | 8/2007 | Cuberson et al. |
| 2007/0208936 | A1 | 9/2007 | Ramos Robles |
| 2007/0268878 | A1 | 11/2007 | Clements |
| 2008/0066096 | A1 | 3/2008 | Wollmershauser et al. |
| 2008/0120661 | A1 | 5/2008 | Ludvig et al. |
| 2008/0147840 | A1 | 6/2008 | Roelens et al. |
| 2008/0276305 | A1 | 11/2008 | Chan et al. |

FOREIGN PATENT DOCUMENTS

| | | |
|---|---|---|
| WO | WO 01/77787 A3 | 10/2001 |
| WO | WO 02/09458 A2 | 1/2002 |
| WO | WO 02/23825 A1 | 3/2002 |

| | | | |
|---|---|---|---|
| WO | WO 02/41587 A3 | 5/2002 | |
| WO | WO 02/077820 A1 | 10/2002 | |
| WO | WO 03/021890 A1 | 3/2003 | |
| WO | WO 03/098461 A1 | 5/2003 | |

OTHER PUBLICATIONS

U.S. Patent Office Official Action issued Jan. 25, 2008 in U.S. Appl. No. 11/076,652, Steven D. Tonnesen.
U.S. Patent Office Official Action issued Oct. 9, 2007 in U.S. Appl. No. 10/683,317, Richard MacKinnon.
U.S. Patent Office Official Action issued Oct. 18, 2007 in U.S. Appl. No. 10/687,002, Richard MacKinnon.
U.S. Patent Office Action issued Jul. 22, 2008, in U.S. Appl. No. 11/076,652, Steven D. Tonnesen, 8 pages.
U.S. Patent Office Action issued Aug. 13, 2008, in U.S. Appl. No. 11/076,591, Patrick Turley, 10 pages.
U.S. Patent Office Action issued Apr. 17, 2008, in U.S. Appl. No. 10/687,002, Tuan Ta, 12 pages.
U.S. Patent Office Action issued Jun. 9, 2008, in U.S. Appl. No. 10/683,317, Richard MacKinnon, 15 pages.
Fan et al, "Distributed Real Time Intrusion Detection System for 3G", 2004, pp. 1566-1570.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Detection", Jun. 6, 2004, pp. 175-193.
Thottethodi et al., "Exploiting Global Knowledge to Achieve Self-Tuned Congestion Control for K-ary n-cute Networks", Mar. 2004, pp. 257-272.
Trabelsi et al., "Malicious Sniffing Systems Detection Platform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
Macleod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
No author, Permeo Drives Out Operational Costs, Simplifies Secure Remote Access, Mar. 28, 2005, pages NA.
No author, Netilla Lauches SSL VPN for Citrix. (Industry Briefs) (Virtual Private Networks) (Brief Article), Sep. 20, 2004, p. 43.
No author, "Secure Remote Access (Network Security) (VPN Gateway 4400 Series) (Brief Article)", Mar. 1, 2004, p. 50.
International Search Report and Written Opinion for related International Application No. PCT/US04/29249, Dec. 15, 2005.
Stone, David, "Securing Wireless LANs with VPN," May 2006, pages NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32912, Apr. 8, 2004.
Lingblom, "Cranite Develops SMB Strategy," CRN, San Jose, CA, Jun. 23, 2003.
"Boingo Wireless Service Installed at LaGuardia Airport" Copyright 2003 M2Communications Ltd., found at www.findarticles.com, Dec. 8, 2003, 1 page.
West Point Unwired: the Military Academy at West Point Continues to Lead the Way in High-Tech Curriculum with Wireless Classroom Networking Copyright 2003 M2Communications.
Molta, "Wireless Hotspots Heat Up," Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (Technology Report)" Apr. 21, 2003, pp. 1-3, www.gcn.com.
Lingblom, "Bluesocket's New Gateway Based on Open Standards—WGX-4000 Switch Wireless Gateway" CRN, Burlington, MA at www.crn.channelsupersearch.com, Apr. 21, 2003.
Dornan, "Wireless LANs: Freedom vs. Security?" Network Magazine, Jul. 2005, pp. 36-39.
O'Shea, "PCTEL looks past patent suite toward fusion of Wi-Fi, PC" Telephony.online, Jun. 2, 2003, pp. 1-2, found at www.telephonyonline.com.
O'Shea, "Boingo to Launch Initiative Aimed at Carrier Market" Telephony.online, Mar. 10, 2003, 1 page, found at www.telephonyonline.com.
International Search Report for PCT/US03/32268 dated Oct. 29, 2004.
Office Action issued in U.S. Appl. No. 11/076,719, dated Sep. 4, 2008, Turley, 7 pages.
Xing, et al., English Language Abstract (p. 1) for "A Survey of Computer Vulnerability Assessment", Chinese Journal of Computers, from the Department of Computer Science and Technology, Tsinghua University,. Beijing, Jan. 2004, pp. 1-11.
Wen, et al., English Language Abstract (p. 4) for "Development of a Snort-Based security network Management and Real-Time Intrusion Detection System", Information Science College, Beijing Normal University, Beijing, China, vol. 40, No. 1, Feb. 2004, 4 pages.
Yu, et al. English Language Abstract (p. 1) for "Fuzzy Logic Based Adaptive Congestion Control Scheme for High-Speed Network", Department of Automation, Shanghai Jiaotong University, Shanghai, China, vol. 33, No. 4, Aug. 2004, 5 pages.
Permeo Supports Microsoft Network Access Protection for Simplified Secure Access; Permeo's Base5 Support of Microsoft Technology Provides "Zero Touch" Enforcement, Newswire, Nerac.com, downloaded from the internet at <<http//web.nerac.com/access/WNDABSM>>, Published Apr. 25, 2003, 2 pages.
"Netilla Launches Secure Gateway Appliance Family of Applications—SSL VPN Products; Initial SGA-C Model Provides Secure Remote Access to Citrix MetaFrame Presentation Server Installations for Under $5,000; Systems Installs in Minutes" Newswire, Nerac.com, downloaded from the internet at <<http//web.nerac.com/access/WNDABSM>>, Published Sep. 13, 2004, 3 pages.
"Fortinet and Aventail Deliver Joint Solution for Clientless Remote and High-Performance Antivirus Protection; Integrated SSL VPN and Antivirus Offering Provider Clientless Remote Access with Complete Content Security" Newswire, Nerac.com, downloaded from the internet at <<http//web.nerac.com/access/WNDABSM>>, Published Jan. 5, 2004, 3 pages.
Hamblen, M., "Cisco Target SSL VPN vendors, adds support for clientless security installed base of VPN devices may give it an edge, despite late entry", Computerworld, Inc., Newswire, Nerac.com, downloaded from the internet at <<http//web.nerac.com/access/WNDABSM>>, Published Nov. 17, 2003, 3 pages.
SBC Technology Resources, Inc., XNMP-XML Network Management Protocol and Interface, Jul. 19, 2002, pp. 1-9, http://www.ietf.org/proceedings/02jul/slides.
Shim, Choon B., XNMP for IP Telephony Management, Enterprise Networks & Servers, Jun. 2006, pp. 1-7, http://www.enterprisenetworksandservers.com.
Office Action issued in U.S. Appl. No. 11/076,652 dated Dec. 11, 2008, Tonnesen, 8 pages.
Office Action issued in U.S. Appl. No. 10/687,002 dated Jan. 7, 2009, Ta, 4 pages.

* cited by examiner

SYSTEM AND METHOD FOR COMPREHENSIVE CODE GENERATION FOR SYSTEM MANAGEMENT

RELATED APPLICATIONS

This application claims the benefit under 35 USC 119(e) of U.S. Provisional Patent application No. 60/551,754, entitled "System and Method for Comprehensive Code Generation for System Management," filed Mar. 10, 2004, which is hereby fully incorporated by reference herein. This application is related to U.S. patent application Ser. No. 10/683,317, filed Oct. 10, 2003 entitled "System and Method for Providing Access Control," by Richard MacKinnon, Kelly Looney, and Eric White, U.S. Provisional Patent Application No. 60/551,704, entitled "System and Method for Network Management XML Architectural Abstraction," by Keith Johnston and Mario Garcia, filed Mar. 10, 2004 and U.S. patent application Ser. No. 11/076,672, entitled "System and Method for Network Management XML Architectural Abstraction" by Keith Johnston and Mario Garcia filed Mar. 10, 2005, each of which is hereby fully incorporated by reference.

TECHNICAL FIELD OF THE INVENTION

This invention generally relates to the management of complex systems and specifically to reducing the manual labor involved in writing the configuration code to allow the system to be managed.

BACKGROUND

Prior code generation systems generate parts of the software management system. For example, SNMP toolkits ship with code generators to generate the stubs that the SNMP agent will call. Persistence systems generate a persistence layer automatically (for example, the JAXB toolkit). However, these prior art systems do not automatically generate all software layers at once.

SUMMARY OF THE INVENTION

The invention automates generation of configuration code so developers can focus on the implementation instead of the infrastructure needed to build the framework required for system management. This solution generates all the layers at once—leaving only the implementation of the configuration 'listeners' to react to changes in the configuration. In one embodiment, the input to the code generation is an SNMP MIB. The output is a layer to connect the SNMP agent code (generated by the SNMP agent toolkit) to the config API, a complete config API that notifies config listeners, and the input to the JAXB persistence API (e.g., an XML schema). The only code the developer now has to write is the configuration listeners, which will react to configuration changes and update the RNSA systems appropriately. One advantage of this solution over previous solutions is its completeness.

One embodiment of the present invention includes a method that generates configuration code using an SNMP MIB, comprising generating a first configuration layer based on an XML MIB derived from the SNMP MIB, wherein the first configuration layer is configured to provide an SNMP Agent with access to a second configuration layer, generating the second configuration layer for a configuration table based on the XML MIB comprising methods for managing the configuration table. The second configuration layer is configured to receive a configuration request containing configuration information representing a change to the configuration table from the SNMP Agent, call a first configuration listener method from a configuration listener layer, receive a first status code from the configuration listener layer. If the status code indicates a success, the method further includes saving the configuration information with a JAXB layer and calling a second configuration listener method to persist the change.

BRIEF DESCRIPTION OF THE FIGURES

A more complete understanding of the present invention and the advantages thereof may be acquired by referring to the following description, taken in conjunction with the accompanying drawings in which like reference indicates like features and wherein.

DETAILED DESCRIPTION

Preferred embodiments of the invention are illustrated in the FIGURES, like numerals being used to refer to like and corresponding parts of the various drawings.

The following applications are hereby fully incorporated by reference herein in their entirety: U.S. application Ser. No. 10/683,317, filed Oct. 10, 2003 entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004 entitled "SYSTEM AND METHOD FOR BEHAVIOR-BASED FIREWALL MODELING," by Patrick Turley which converted into U.S. application Ser. No. 11/076,719, filed Mar. 10, 2005 entitled "SYSTEM AND METHOD FOR BEHAVIOR-BASED FIREWALL MODELING," by Richard MacKinnon, Kelly Looney, and Eric White; U.S. Provisional Application No. 60/551,754, filed Mar. 10, 2004 entitled "SYSTEM AND METHOD FOR COMPREHENSIVE CODE GENERATION FOR SYSTEM MANAGEMENT," by Keith Johnston which converted into U.S. application Ser. No. 11/078,223, filed Mar. 10, 2005 entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004 entitled "SYSTEM AND METHOD FOR PROVIDING A CENTRALIZED DESCRIPTION/ CONFIGURATION OF CLIENT DEVICES ON A NETWORK ACCESS GATEWAY," by Patrick Turley and Keith Johnston; U.S. Provisional Application No. 60/551,702, filed Mar. 10, 2004 entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen which converted into U.S. application Ser. No. 11/076,591, filed Mar. 10, 2005 entitled "METHOD AND SYSTEM FOR CONTROLLING NETWORK ACCESS," by Patrick Turley, Keith Johnston, and Steven D. Tonnesen; U.S. Provisional Application No. 60/551,699, filed Mar. 10, 2004 entitled "SYSTEM AND METHOD FOR DYNAMIC BANDWIDTH CONTROL," by Patrick Turley, et al.; U.S. Provisional Application No. 60/551,697, filed Mar. 10, 2004 entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005 entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,705, filed Mar. 10, 2004 entitled "SYSTEM AND METHOD FOR DOUBLE-CAPTURE/DOUBLE-REDIRECT TO A DIFFERENT LOCATION," by Keith Johnston, et al. which converted into U.S. application Ser. No. 11/076, 646, filed Mar. 10, 2005 entitled "SYSTEM AND METHOD FOR DOUBLE-CAPTURE/DOUBLE-REDIRECT TO A DIFFERENT LOCATION," by Keith Johnston, et al.; U.S. Provisional Application No. 60/551,704, filed Mar. 10, 2004 entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672, filed Mar. 10, 2005 entitled "SYSTEM AND METHOD FOR NETWORK MANAGEMENT XML ARCHITECTURAL ABSTRACTION," by Keith Johnston and Mario Garcia; and U.S. Provisional Application No. 60/660,408, filed Mar. 10, 2005 entitled "SYSTEM AND METHOD FOR PROVIDING A CENTRALIZED DESCRIPTION!CONFIGURATION OF CLIENT DEVICES ON A NETWORK ACCESS GATEWORK," by Patrick Turley, et al.

Figure 1:
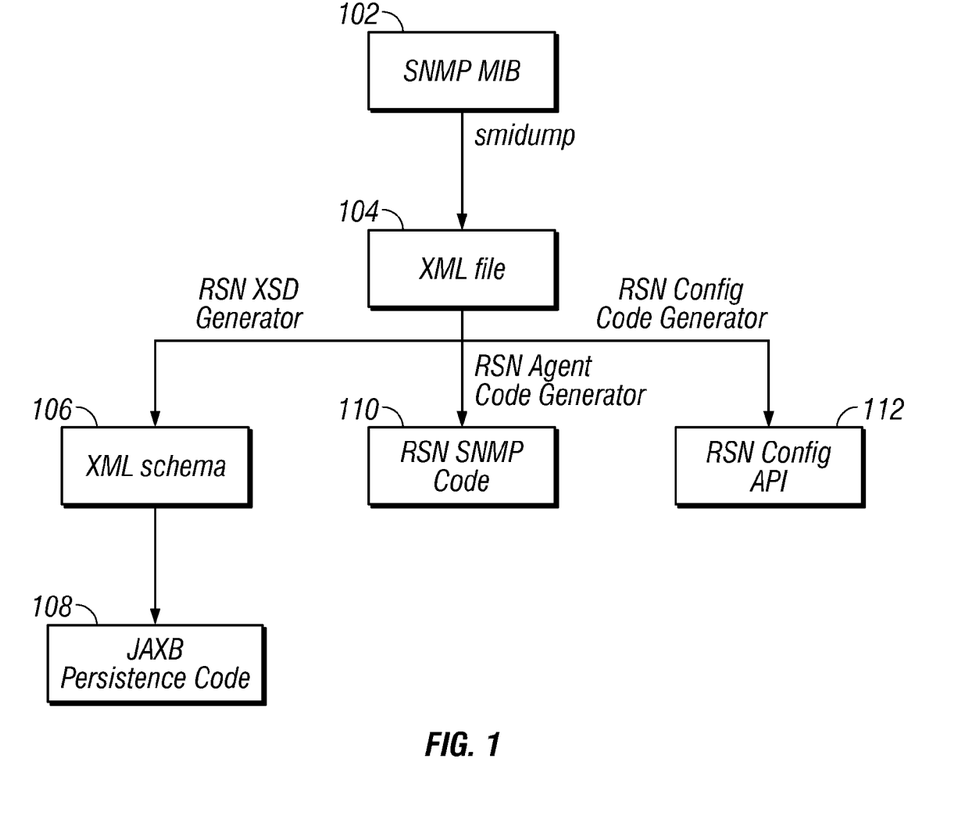
FIG. 1 illustrates the flow of one embodiment of the code generation system and method of the invention.

FIG. 1 shows the flow of one embodiment of the code generation system and method of the invention. The SNMP MIB 102 is used to generate the XML file 104. The XML file 104 is then used to produce the XML Schema 106 for JAXB code generation (represented at 108), the RSN SNMP code 110 that extends the SNMP toolkit code, and the RSN Config API 112, which is used by both the SNMP code and an HTML Admin interface to update the JAXB layer and notify any config listeners (discussed in conjunction with FIG. 5 below).

The XML version of the MIB contains metadata about the configuration variables in the system. According to one embodiment, the XML MIB is generated by a tool called library access SMI (libsmi), which is a library that allows management applications to access SMI MIB module definitions. The XML schema for the MIB can be generated as described in U.S. Provisional Application No. 60/551,704, filed Mar. 10, 2004 entitled "SYSTEM AND METHOD FOR NETWORK MANAGEMENT XML ARCHITECTURAL ABSTRACTION," by Keith Johnston and Mario Garcia, U.S. application Ser. No. 11/076,672, filed Mar. 10, 2005 entitled "SYSTEM AND METHOD FOR NETWORK MANAGEMENT XML ARCHITECTURAL ABSTRACTION," by Keith Johnston and Mario Garcia. The JAXB persistence classes are generated by the JAXB implementation provided by Sun Microsystems (Sun Microsystems is a trademark of Sun Microsystems, Inc. of Santa Clara, Calif.). The JAXB tool binds an XML schema to a representation in JAVA code.

Figure 3:
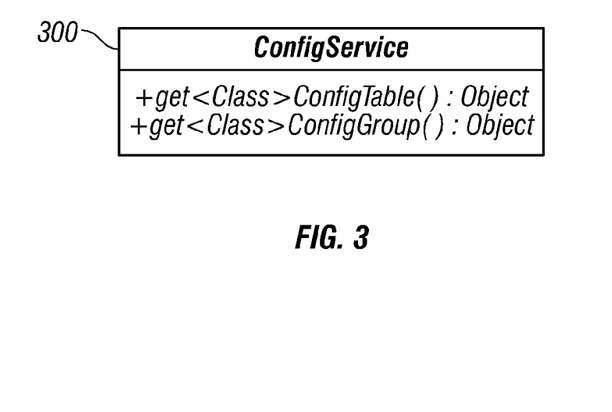
FIGS. 3-8 provide UML diagrams illustrating one embodiment of the class structure and algorithms for an embodiment of the configuration system.

The config API 112 provides a high-level abstraction (e.g., language specific, such as JAVA) of the MIB table and group objects. The table and group classes, as described in conjunction with FIG. 4 and the configService class, described in conjunction with FIG. 3, are generated based on the XML MIB. Additionally, the listener interfaces, described in conjunction with FIG. 5, are generated from the XML MIB. Config API 112 can be generated by parsing the XML MIB, generating an internal representation of the data structures of the MIB and translating them to a high-level language.

SNMP code 110 is also generated from the XML MIB. According to one embodiment, the SNMP code 110 can be generated using the iReasoning SNMP Agent Builder by iReasoning, Inc. of Reno, Nev. The SNMP code 110 can be the iReasoning SNMP agent extended to support the classes of the Config API in response to table and group operation.

Thus, the code generator to generate very specific code for the SNMP agent and the JAXB schema. According to one embodiment, the metadata comes from the MIB, so the constraints on the data are limited to SNMP constraints. The metadata contained in the XML includes the data type of the field, including several predefined types (RSN-specific types): string, integer, and enumerated types are the most common data types. These are mapped to XMLSchema types supported by JAXB. Additionally, methods to convert between the SNMP agent and the config API use the data type information to convert between these two layers. Code in the config API layer is also generated to validate constraints on the data. For example, if a field is an IP address, the code in the config layer can ensure that the value passed in is a valid IP address.

Using code generation allows the addition of new features relatively quickly. For example, a two phase commit mechanism can be used in the config listeners. When a configuration change comes in through SNMP—first a "preSet" method can be called in the config listener. If that method does not return an error, then the "set" method can be called. However, by the time the set method is called, the value has been persisted in the JAXB layer. If an error occurs in the set method, then the code generated config API can restore the original value and persist it. Another example where the code generation can be useful is in logging. When any configuration change is made in the system, a log message is written. The code that generates the log message is all generated by the code generator. Another example of a feature that can be added through code generation is a test to see if the value being set actually changed. This check in the config API can be code generated for every value and every table. If no value changed—then the config listener is not called.

Figure 2:
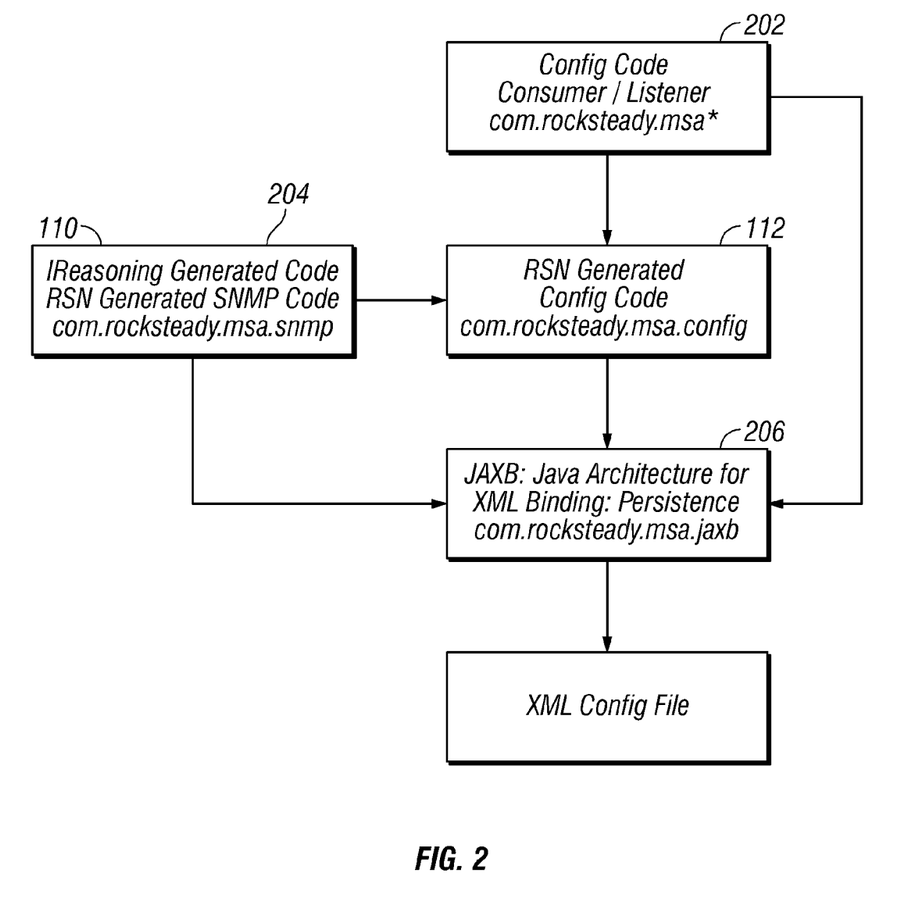
FIG. 2 illustrates the calling hierarchy for one embodiment of the configuration system and method.

FIG. 2 shows the calling hierarchy for one embodiment of the configuration system and method of the invention. At block 202 are the custom classes written by a user. These classes include code that initializes the system at startup—those classes access the persistence layer through the generated config API and the JAXB layer. The other custom classes are the config listener classes. These classes respond to changes in the configuration system—the config API calls the listeners when a change is made in the configuration.

The remaining layers are classes that are all automatically code generated according to the invention. The iReasoning SNMP code 204 is, for example, generated by an iReasoning-provided tool. The config API is generated by the RSN code generator. The JAXB layer 206 is generated from an XML schema, which itself is generated by the RSN code generator. One of skill in the art can appreciate that other automated mechanisms can be used to generate these remaining layers of code (and that other classes of code can be automatically generated).

FIGS. 3 to 8 consist of UML diagrams illustrating the high level class structure and algorithms for one embodiment of the configuration system.

FIG. 3 is a class diagram illustrating the ConfigService class 300. For convenience, one embodiment of the Config API has one entry point that provides access to most of its functionality. The ConfigService class implements the singleton pattern and can be thought of as a service. The ConfigService class is code generated by the RSN code generator from the XML MIB. A single instance of this class provides access to all the table and group objects generated from the MIB, described in conjunction with FIG. 4.

Figure 4:
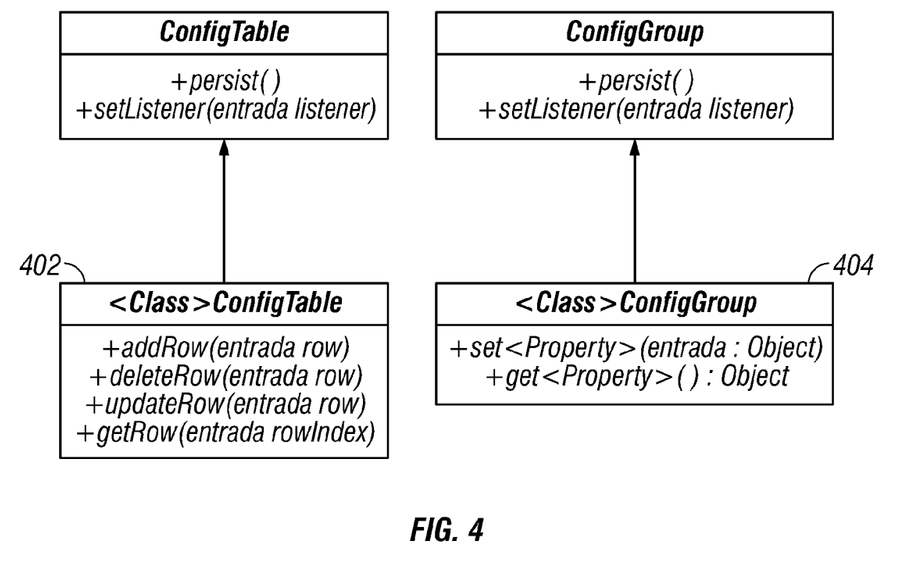
Figure 5:
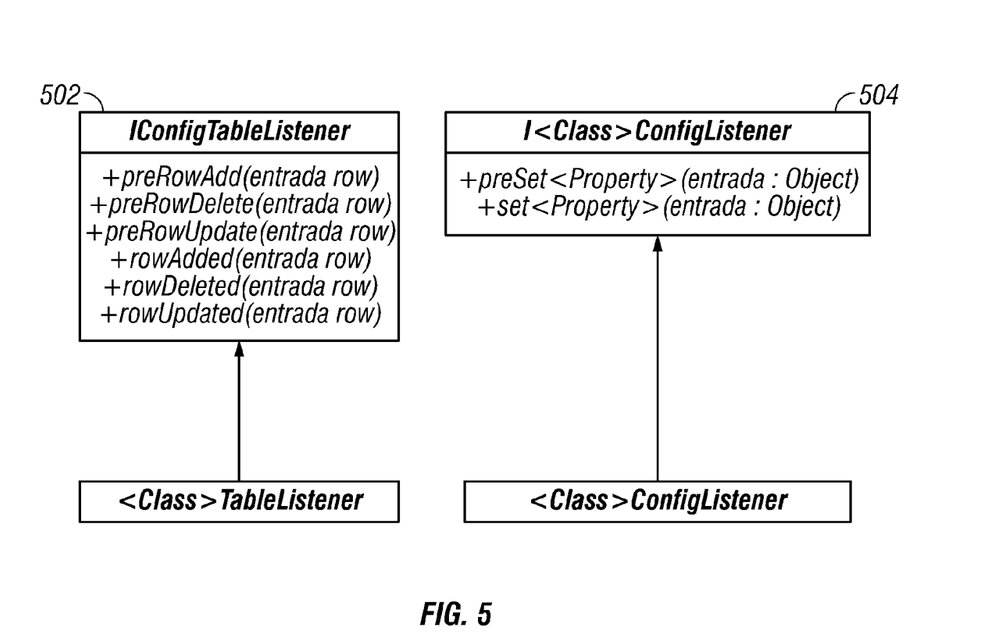

FIG. 4 shows the framework classes for managing tables and groups. MIB schemas organize data in tables and groups. Tables consist of similar rows; each row can contain one or more properties. Groups are simpler data structures containing one or more properties. ConfigTable is a framework base class which contains basic methods for managing config tables. ConfigGroup is another framework base class which contains basic methods for managing config groups.

For each table in the XML MIB, a subclass of ConfigTable is generated. These derived classes are named <Class>ConfigTable where <Class> is the name of the table in the XML MIB. One example of a subclass <Class>ConfigTable is illustrated at 402. They contain methods for managing table rows. Specifically, they provide methods for adding, deleting, and updating table rows.

Similarly, for each group in the XML MIB, a subclass of ConfigGroup is generated. These derived classes are named <Class>ConfigGroup (represented at 404) where <Class> is the name of the group in the XML MIB. They contain methods for managing group entries. Specifically, they provide methods for setting the values of group properties.

By using the data structures described above, the API provides an abstraction that hides the details of the underlying implementation. The API can be extended to other schemas such as JMX.

FIG. 5 illustrates one embodiment of the configuration listener class structure. IConfigTableListener (represented at 502) is an interface that, according to one embodiment, all table listeners implement. It defines the following methods:

| | |
|---|---|
| preRowAdd(row) | Called before a row is added |
| preRowDelete(row) | Called before a row is deleted |
| preRowUpdate(row) | Called before a row is updated |
| rowAdded(row) | Called after a row has been added |
| rowDeleted(row) | Called after a row has been deleted |
| rowUpdated(row) | Called after a row has been updated |

The implementation classes for the methods, according to one embodiment, are not code generated and are user written. This is where the framework user inserts domain specific code to react to configuration changes. Each of these methods returns a status code determining whether the operation succeeds or fails. If the operation fails, the framework undoes any changes and the original values are retained. If the operation succeeds, the data is persisted to the configuration XML file. Thus these methods provide a way for the framework user to "veto" any configuration changes.

I<Class>ConfigListener (represented at 504) is a code generated interface that defines method for monitoring changes to a configuration group where <Class> is the name of the group in the XML MIB. Since each config group has different properties, these interfaces define methods of the following form:

| | |
|---|---|
| preSet<Property> | Called before a property in the group is set |
| set<Property> | Called after a property in the group is set |

As with table listeners above, the implementation classes for the methods are user coded and return the appropriate status code.

Figure 6:
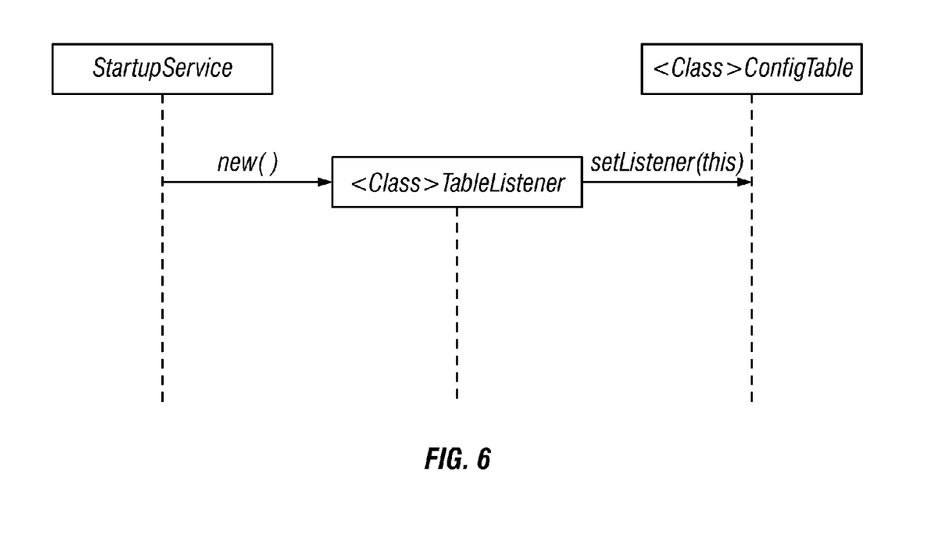
Figure 7:
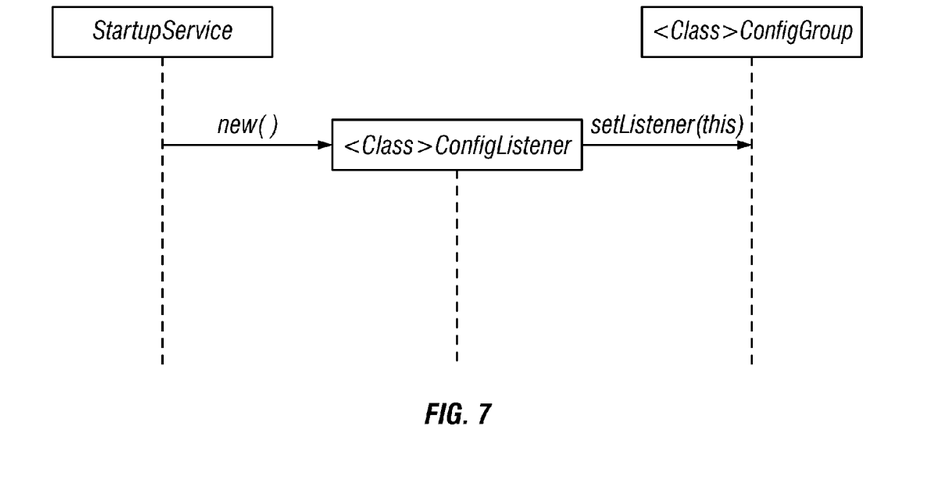

FIGS. 6 and 7 are sequence diagrams illustrating how configuration listeners can be registered with their respective table and group configuration objects. In this particular embodiment, registration is done in the listener constructor. When a table or group listener is instantiated, the constructor calls the setListener() method of the table or group configuration object they want to monitor. In these diagrams, Startup Service represents the initialization code that runs when the system is brought online.

Figure 8:
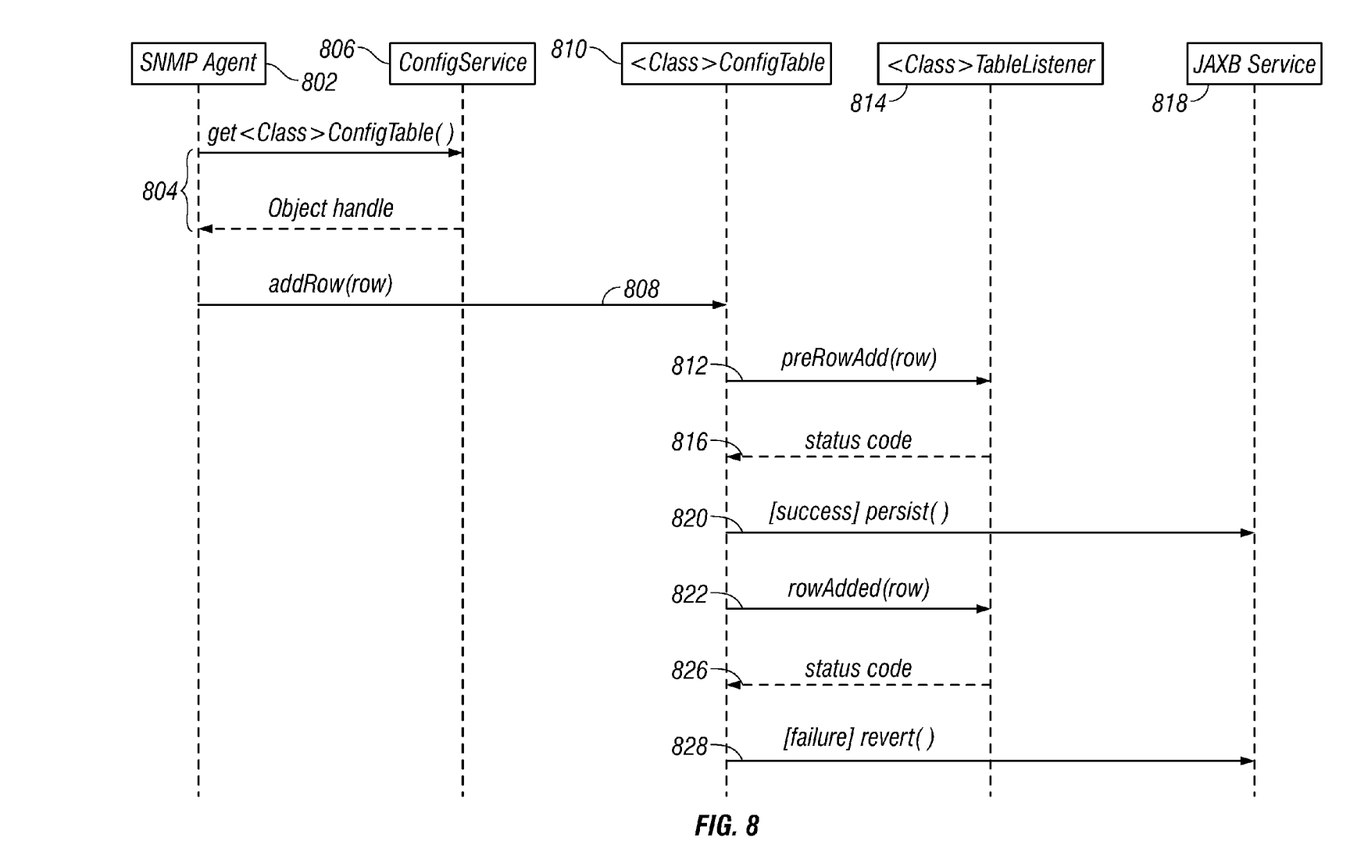

FIG. 8 is a sequence diagram illustrating an example where a custom SNMP agent 802 is attempting to add a row to a table. At 804, the SNMP agent first obtains the config table handle from the ConfigService 806. At 808, the agent 802 then calls the addRow() method on the config table object 810. The config table object 810 checks if it has a config table listener registered, and if found calls its preRowAdd() method (step 812). The config table listener 814 can at this point return a success or failure status code (step 816). If success is returned, the config table object 810 saves the new row with the JAXB service 818 (step 820). At step 822, then calls the rowAdded() method on the config table listener 814. The listener 814 again has the opportunity to veto the change by returning a failure status code (step 826). If the call succeeds, the change remains and the method returns. Otherwise the change is reverted and nothing is saved to the XML store (step 828).

What is claimed is:

1. A method for generating configuration code using an SNMPMIB, comprising:
    generating a first configuration layer based on an Extensible Markup Language (XML) MIB derived from the SNMP MIB, wherein the first configuration layer is configured to provide an SNMP Agent with access to a second configuration layer; and
    generating the second configuration layer based on the XML MIB for a configuration table, wherein the second configuration layer comprises methods for managing the configuration table, and wherein the second configuration layer is configured to:
        receive a configuration request containing configuration information representing a change to a configuration table from the SNMP Agent;
        call a first configuration listener method from a configuration listener layer;
        receive a status code corresponding to the configuration request from the first configuration listener layer; and
        if the status code indicates a success:
            save the configuration information with a Java Architecture for XML Binding (JAXB) layer, wherein the JAXB layer is generated based on the XML MIB derived from the SNMP MIB; and
            call a second configuration listener method to persist the change.

2. The method of claim 1, further comprising:
    generating an XML schema based on the XML MIB that represents an input to the JAXB layer.

3. The method of claim 1, wherein the second configuration layer is configured to call a table listener.

4. The method of claim 1, wherein the second configuration layer is configured to call a group listener.

5. A computer-readable storage medium carrying program instructions executable by a processor to perform automated code generation using a Simple Network Management Protocol (SNMP) Management Information Base (MIB), wherein code generated by the automated code generation comprises:
  at least a first configuration layer and a second configuration layer, where the first configuration layer is operable to provide an SNMP Agent with access to the second configuration layer, wherein the second configuration layer comprises methods for managing a configuration table, and wherein the second configuration layer is operable to:
  receive a configuration request from the SNMP Agent, wherein the configuration request contains configuration information representing a change to the configuration table;
  call a first configuration listener from a configuration listener layer, wherein the configuration listener layer comprises a configuration table listener for monitoring changes to the configuration table and a configuration group listener for monitoring changes to a configuration group;
  receive a status code from the first configuration listener; and
    if the status code indicates a success:
      save the configuration information with a Java Architecture for XML Binding (JAXB) layer wherein the JAXB layer was generated based on an Extensible Markup LanQuaQe (XML) MIB derived from the SNMP MIB; and
      call a second configuration listener to persist the change.

6. The storage medium of claim 5, wherein the code generated comprises a test.

7. The storage medium of claim 5, wherein the code generated comprises a log message.

8. The storage medium of claim 5, wherein the first configuration layer comprises an XML Schema Definition (XSD) generator.

9. The storage medium of claim 5, wherein the first configuration layer comprises an Agent Code generator.

10. The storage medium of claim 5, wherein the first configuration layer comprises a Configuration Code generator.

11. The storage medium of claim 5, wherein the first configuration layer comprises an API configuration layer.

12. A system for automated code generation using a Simple Network Management Protocol (SNMP) Management Information Base (MIB), comprising:
  a processor; and a memory having computer executable instructions operable to implement a code generator for generating:
  a first configuration layer for providing an SNMP Agent with access to a second configuration layer, wherein the first configuration layer is based on an Extensible Markup Language (XML) MIB derived from the SNMP MIB;
  a configuration group listener generated from a configuration listener layer for monitoring changes to a configuration group;
  a configuration table listener generated from a configuration listener layer for monitoring changes to a configuration table;
  a second configuration layer for generating a JAXB persistence code, wherein the second configuration layer is operable to:
  receive a configuration request containing configuration information representing a change to the configuration table from the SNMP Agent;
  call a first configuration listener from the configuration group listener and configuration table listener;
  receive a first status code from the first configuration listener; and
  if the status code indicates a success:
    save the configuration information with a JAXB layer; wherein the JAXB layer was generated based on the Extensible Markup Language (XML) MIB derived from the SNMP MIB; and
  call the second configuration listener for persisting the change.

13. The system of claim 12, wherein the code generated comprises a test.

14. The system of claim 12, wherein the code generated comprises a log message.

15. The system of claim 12, wherein the first configuration layer comprises an XSD generator.

* * * * *